(12) United States Patent
Svendsen

(10) Patent No.: US 7,680,959 B2
(45) Date of Patent: Mar. 16, 2010

(54) P2P NETWORK FOR PROVIDING REAL TIME MEDIA RECOMMENDATIONS

(75) Inventor: Hugh Svendsen, Chapel Hill, NC (US)

(73) Assignee: Napo Enterprises, LLC, Wilmington, DE (US)

(*) Notice: Subject to any disclaimer, the term of this patent is extended or adjusted under 35 U.S.C. 154(b) by 0 days.

(21) Appl. No.: 11/484,130

(22) Filed: Jul. 11, 2006

(65) Prior Publication Data

US 2008/0016205 A1 Jan. 17, 2008

(51) Int. Cl.
*G06F 15/16* (2006.01)

(52) U.S. Cl. ........................ 709/248; 709/213

(58) Field of Classification Search ................. 709/201, 709/204, 205, 213, 231; 455/3.06, 3.01, 455/3.02, 3.03, 3.05; 700/90, 94, 91, 92; 725/86, 87, 98; 705/50, 51, 64
See application file for complete search history.

(56) References Cited

U.S. PATENT DOCUMENTS

| | | | |
|---|---|---|---|
| 4,870,579 | A | 9/1989 | Hey |
| 5,621,456 | A | 4/1997 | Florin et al. |
| 5,963,916 | A | 10/1999 | Kaplan |
| 6,195,657 | B1 | 2/2001 | Rucker et al. |
| 6,266,649 | B1 | 7/2001 | Linden et al. |
| 6,317,722 | B1 | 11/2001 | Jacobi et al. |
| 6,353,823 | B1 | 3/2002 | Kumar |
| 6,388,714 | B1 | 5/2002 | Schein et al. |
| 6,438,579 | B1 | 8/2002 | Hosken |
| 6,526,411 | B1 | 2/2003 | Ward |
| 6,567,797 | B1 | 5/2003 | Schuetze et al. |
| 6,615,208 | B1 | 9/2003 | Behrens et al. |

(Continued)

FOREIGN PATENT DOCUMENTS

EP 1536352 A1 6/2005

(Continued)

OTHER PUBLICATIONS

"MyStrands for Windows 0.7.3 Beta" downloaded from Internet <http://www.shareapple.com/172-MyStrandsWindowsPAD.htm> on Jul. 18, 2007.*

(Continued)

*Primary Examiner*—William C Vaughn, Jr.
*Assistant Examiner*—Scott Christensen
(74) *Attorney, Agent, or Firm*—Withrow & Terranova, PLLC

(57) ABSTRACT

A peer-to-peer (P2P) network for providing real time media recommendations is provided. The media recommendations may be song recommendations or video recommendations. Each time a media presentation is played by a peer device, the peer device provides a recommendation identifying the media presentation to other peer devices in the P2P network. A peer device having received recommendations from the other peer devices in the P2P network then programmatically, or automatically, selects a next media presentation to play from the media presentations recently played by the other peer devices and one or more locally stored media presentations. If the selected media presentation is not stored locally by the peer device, the peer device may obtain the selected media presentation from a subscription based service enabling streaming or download of the selected media presentation, an e-commerce service enabling purchase and download of the selected media presentation, or another peer device.

53 Claims, 13 Drawing Sheets

U.S. PATENT DOCUMENTS

| | | |
|---|---|---|
| 6,629,104 B1 | 9/2003 | Parulski et al. |
| 6,636,836 B1 | 10/2003 | Pyo |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,941,275 B1 | 9/2005 | Swierczek |
| 6,941,324 B2 | 9/2005 | Plastina et al. |
| 6,947,922 B1 | 9/2005 | Glance |
| 6,976,228 B2 | 12/2005 | Bernhardson |
| 6,990,453 B2 | 1/2006 | Wang et al. |
| 7,013,301 B2 | 3/2006 | Holm et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,177,872 B2 | 2/2007 | Schwesig et al. |
| 7,222,187 B2 | 5/2007 | Yeager et al. |
| 7,283,992 B2 | 10/2007 | Liu et al. |
| 7,496,623 B2 | 2/2009 | Szeto et al. |
| 7,594,246 B1 | 9/2009 | Billmaier et al. |
| 2001/0013009 A1 | 8/2001 | Greening et al. |
| 2001/0021914 A1 | 9/2001 | Jacobi et al. |
| 2002/0052207 A1 | 5/2002 | Hunzinger |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2003/0001907 A1 | 1/2003 | Bergsten et al. |
| 2003/0014407 A1 | 1/2003 | Blatter et al. |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0089218 A1 | 5/2003 | Gang et al. |
| 2003/0115167 A1 | 6/2003 | Sharif et al. |
| 2003/0135513 A1 | 7/2003 | Quinn et al. |
| 2003/0149612 A1 | 8/2003 | Berghofer et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0237093 A1 | 12/2003 | Marsh |
| 2004/0003392 A1 | 1/2004 | Trajkovic et al. |
| 2004/0034441 A1 | 2/2004 | Eaton et al. |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0267604 A1 | 12/2004 | Gross |
| 2005/0021420 A1 | 1/2005 | Michelitsch et al. |
| 2005/0021678 A1 | 1/2005 | Simyon et al. |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0120053 A1 | 6/2005 | Watson |
| 2005/0125222 A1 | 6/2005 | Brown et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278758 A1 | 12/2005 | Bodleander |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0143236 A1 | 6/2006 | Wu |
| 2006/0156242 A1 | 7/2006 | Bedingfield |
| 2006/0174277 A1 | 8/2006 | Sezan et al. |
| 2006/0195479 A1 | 8/2006 | Spiegelman et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1* | 8/2006 | Rogers et al. ............... 715/727 |
| 2006/0200435 A1 | 9/2006 | Flinn et al. |
| 2006/0218187 A1 | 9/2006 | Plastina et al. |
| 2006/0227673 A1 | 10/2006 | Yamashita et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0078714 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118657 A1 | 5/2007 | Kreitzer et al. |
| 2007/0118853 A1 | 5/2007 | Kreitzer et al. |
| 2007/0118873 A1 | 5/2007 | Houh et al. |
| 2007/0162502 A1 | 7/2007 | Thomas et al. |
| 2007/0214182 A1 | 9/2007 | Rosenberg |
| 2007/0238427 A1 | 10/2007 | Kraft et al. |
| 2007/0244880 A1 | 10/2007 | Martin et al. |
| 2007/0265870 A1 | 11/2007 | Song et al. |
| 2007/0269169 A1 | 11/2007 | Stix et al. |

| | | | |
|---|---|---|---|
| 2008/0010372 | A1 | 1/2008 | Khedouri et al. |
| 2008/0016205 | A1 | 1/2008 | Svendsen |
| 2008/0032723 | A1 | 2/2008 | Rosenberg |
| 2008/0052371 | A1 | 2/2008 | Partovi et al. |
| 2008/0091771 | A1 | 4/2008 | Allen et al. |
| 2008/0133601 | A1 | 6/2008 | Martin Cervera et al. |
| 2008/0208823 | A1 | 8/2008 | Hicken |
| 2008/0270561 | A1 | 10/2008 | Tang et al. |
| 2009/0129671 | A1 | 5/2009 | Hu et al. |

FOREIGN PATENT DOCUMENTS

| | | |
|---|---|---|
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/126135 A2 | 11/2006 |

OTHER PUBLICATIONS

"MyStrands for Windows Change Log." downloaded from Internet <http://www.mystrands.com/mystrands/windows/changelog.vm>.*
GenieLab.com grants music lovers' wishes, http://barometer.orst.edu/home/index.cfm?event=displayArticlePrinterFriendly&uStory_id=5c420acf-a1fb-448c-8ffd-39ec5c448b6f.
That canadian girl blog archive—GenieLab, http://www.thatcanadiangirl.co.uk/blog/2005/02/22/genielab/.
Digital Tech Life Download of the Week, http://www.digitaltechlife.com/category/download-of-the-week/.
Music Recommendations 1.0, http://www.macupdate.com/info.php/id/19575.
"ChoiceStream, Technology Brief, Review of Personalization Technologies: Collaborative Filtering vs. ChoiceStream's Attributized Bayesian Choice Modeling."
Badrul M. Sarwar et al., "Recommender Systems for Large-scale E-Commerce: Scalable Neighborhood Formation Using Clustering," 2002.
Soundflavor DJ for iTunes, http://www.soundflavor.com/.
MusicIP—The Music Search Engine, http://www.musicip.com/.
Last fm the social music revolution, http://www.last.fm/.
Webjay—Playlist Community, http://www.webjay.org/.
Better Propaganda—Free MP3s and music videos, http://www.betterpropaganda.com/.
Mercora—Music Search and Internet Radio Network, http://search.mercora.com/v6/_front/web.jsp.
MP3 music download website, eMusic, http://www.emusic.com/.
Welcome to the MUSICMATCH Guide, http://mmguide.musicmatch.com/.
UpTo11.net—Music Recommendations and Search, http://www.upto11.net/.
Loomia—Personalized Recommendations For Media, Content and Retail Sites, http://www.loomia.com/.
Try Napster free for 7 Days, http://www.napster.com/choose/index.html.
Apple—iPod+ iTunes, http://www.apple.com/itunes/.
Pandora Internet Radio, http://www.pandora.com/.
MyStrands Download, http://www.mystrands.com/overview.vm.
Napster—All The Music You Want, http://www.napster.com/using_napster/all_the_music_you_want.html.
Take a look at the Future of Mobile Music :: Music Guru, http://www.symbian-freak.com/news/006/02/music_guru.htm.
Gracenote, http://www.gracenote.com/.
Wired News, http://www.wired.com/news/digiwood/1,57634-0.html.
"MUSICSTRANDS.COM Because Music is Social," 2006.
"Last.fm" from Wikipedia, http://en.wikipedia.org/wiki/Last.fm, last modified on Aug. 8, 2006, printed Aug. 8, 2006, 7 pages.
"MusicStrands Rustles Funding Following Mobile Announcement," Digital Music News, Mar. 6, 2006, p. 3 of 5.

"Yahoo Music Jukebox" from Wikipedia, http://en.wikipedia.org/wiki/Yahoo_music_engine, last modified on Aug. 3, 2006, printed on Aug. 8, 2006, 1 page.
"Mercora—Music Search and Internet Radio Network", www.mercora.com/overview.asp, copyright 2004-2006 Mercora, Inc., 1 page.
"LimeWire" from Wikipedia, http://en.wikipedia.org/wiki/Limewire, last modified on Aug. 6, 2006, printed on Aug. 8, 2006, 2 pages.
"Amazon.com: Online Shopping for Electronics, Apparel, Computers, Books, DVDs & m . . . ," http://www.amazon.com/, copyright 1996-2007 Amazon.com, Inc. or its affiliates, printed Oct. 26, 2007, 4 pages.
"Apple—iPod classic," http://www.apple.com/ipodclassic/, printed Oct. 26, 2007, 1 page.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"The Classic TV Database—Your Home for Classic TV!—www.classic-tv.com," http://www.classic-tv.com/, copyright The Classic TV Database—www.classic-tv.com, printed Feb. 7, 2007, 3 pages.
"Genielab::Music Recommendation System," http://web.archive.org/web/20060813000442/http://genielab.com/, copyright 2005 GenieLab, LLC, printed Oct. 30, 2007, 1 page.
"Gracenote Playlist," Revised Dec. 29, 2005, copyright 2005 Gracenote, 2 pages.
"Gracenote Playlist Plus," Revised Dec. 29, 2005, copyright 2005 Gracenote, 2 pages.
"IEEE 802.11—Wikipedia, the free encyclopedia," http://en.wikipedia.org/wiki/IEEE_802.11, printed Oct. 26, 2007, 5 pages.
"iLike TM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Liveplasma music, movies, search engine and discovery engine," http://www.liveplasma.com/, printed May 17, 2007, 1 page.
"Mongomusic.com—The Best Download mp3 Resources and Information. This website is for sale!," http://www.mongomusic.com/, printed May 17, 2007, 2 pages.
"MusicGremlin," http://www.musicgremlin.com/StaticContent.aspx?id=3, copyright 2005, 2006, 2007 MusicGremlin, Inc., printed Oct. 26, 2007, 1 page.
"FAQ," http://blog.pandora.com/faq/, copyright 2005-2006 Pandora Media, Inc., printed Aug. 8, 2006, 20 pages.
"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—Free," http://www.rhapsody.com/welcome.html, copyright 2001-2007 Listen.com, printed Feb. 7, 2007, 1 page.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself," http://www.youtube.com/, copyright 2007 YouTube, LLC, printed Oct. 26, 2007, 2 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Outlook Home Page—Microsoft Office Online," http://office.microsoft.com/en-us/outlook/default.aspx, copyright 2007 Microsoft Corporation, printed Nov. 8, 2007, 1 page.
"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyourmusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

"Goombah—Preview," http://www.goombah.com/preview.html, printed Jan. 8, 2008, 5 pages.

Jeff Mascia et al., "Lifetrak: Music In Tune With Your Life," copyright 2006, 11 pages.

Jun Wang et al., "Music Recommender System for Wi-Fi Walkman," Delft University of Technology, 23 pages.

"Ringo: Social Information Filtering for Music Recommendation," http://jolomo.net/ringo.html, printed Aug. 3, 2009, 1 page.

"Tour's Profile," http://mog.com/Tour, copyright 2006-2009 Mog Inc., printed Aug. 3, 2009, 11 pages.

* cited by examiner

CURRENT SONG
CURRENT ALBUM

USER: HUGH

— 142

| user | song | artist | genre | decade | time | availability | score |
|---|---|---|---|---|---|---|---|
| hugh | sweet emotion | aerosmith | rock | 1970s | 45:32:21 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

*FIG. 13*

CURRENT SONG
CURRENT ALBUM

USER: HUGH

| user | song | artist | genre | decade | time | availability | score |
|---|---|---|---|---|---|---|---|
| gary | dance in my sleep | dave adams | alternative | 1980s | 4:25 | subscription network | 92 |
| hugh | say hey | the tubes | alternative | 1980s | 20:54:24 | local | 86 |
| hugh | you get what you give | new radicals | alternative | 1990s | 4:12:03 | local | 83 |
| gene | alison | elvis costello | alternative | 1980s | 5:51 | buy/download | 65 |
| hugh | sweet emotion | aerosmith | rock | 1970s | 45:32:21 | local | 95 |
| hugh | running with the devil | van halen | rock | 1970s | 12:35:11 | local | 82 |
| gene | beautiful day | u2 | rock | 2000s | 7:54 | local | 79 |
| gary | heart of the night | poco | rock | 1970s | 0:42 | subscription network | 67 |
| gary | roundabout | yes | rock | 1970s | 6:11 | buy/download | 67 |
| mike | hound dog | elvis presley | rock | 1980s | 6:19 | buy/download | 55 |
| mike | still lovin you | scorpions | metal | 1980s | 1:03 | subscription network | 76 |
| gary | run to the hills | iron maiden | metal | 1970s | 7:21 | local | 64 |
| waymen | so what | miles davis | jazz | 1960s | 6:37 | find | 94 |
| waymen | come away with me | norah jones | jazz | 2000s | 4:56 | subscription network | 88 |
| gene | rebel yell | billy idol | punk | 1980s | 0:32 | subscription network | 81 |
| hugh | tenderness | general public | new wave | 1980s | 5:31 | local | 83 |
| gene | true | spandau ballet | dance | 1980s | 25:32:21 | subscription network | 72 |
| mike | walk the line | johnny cash | country | 1970s | 3:31 | buy/download | 86 |
| waymen | something more | sugarland | country | 2000s | 0:37 | subscription network | 25 |

P2P NETWORK FOR PROVIDING REAL TIME MEDIA RECOMMENDATIONS

FIELD OF THE INVENTION

The present invention relates to media recommendations, such as music or video recommendations, and more specifically relates to a peer-to-peer (P2P) network for providing real time media recommendations.

BACKGROUND OF THE INVENTION

In recent years, there has been an enormous increase in the amount of digital media, such as music, available online. Services such as Apple's iTunes enable users to legally purchase and download music. Other services such as Yahoo! Music Unlimited and RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora (http://www.pandora.com), SoundFlavor (http://www.soundflavor.com), MusicIP (http://www.musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm (http://www.last.fm), Music Strands (http://www.musicstrands.com), WebJay (http://www.webjay.org), Mercora (http://www.mercora.com), betterPropaganda (http://www.betterpropaganda.com), Loomia (http://www.loomia.com), eMusic (http://www.emusic.com), musicmatch (http://www.mmguide.musicmatch.com), genielab (http://genielab.com/), upto11 (http://www.upto11.net/), Napster (http://www.napster.com), and iTunes (http://www.itunes.com) with its celebrity playlists.

The problem with these traditional recommendation systems is that they fail to consider peer influences. For example, the music that a particular teenager listens to may be highly influenced by the music listened to by a group of the teenager's peers, such as his or her friends. As such, there is a need for a music recommendation system and method that recommends music to a user based on the listening habits of a peer group.

SUMMARY OF THE INVENTION

The present invention provides a peer-to-peer (P2P) network for providing real time media recommendations. The media recommendations may be song recommendations or video recommendations. Each time a media presentation is played by a peer device, the peer device provides a recommendation identifying the media presentation to other peer devices in the P2P network. A peer device having received recommendations from the other peer devices in the P2P network then programmatically, or automatically, selects a next media presentation to play from the media presentations recently played by the other peer devices and one or more locally stored media presentations. If the selected media presentation is not stored locally by the peer device, the peer device may obtain the selected media presentation from a subscription based service enabling streaming or download of the selected media presentation, an e-commerce service enabling purchase and download of the selected media presentation, or another peer device. In one embodiment, the peer devices are portable devices forming the P2P network via local wireless communication. In another embodiment, the peer devices may be any type of device and form the P2P network via a Wide Area Network (WAN) such as the Internet.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 13 illustrates an exemplary GUI displaying a playlist including both songs from a local music collection of a peer device and recommended songs from other peer devices, where the songs are sorted by a score determined based on user preferences according to one embodiment of the present invention;

FIG. 14 illustrates an exemplary GUI displaying a playlist including both songs from a local music collection of a peer device and recommended songs from other peer devices, where the songs are sorted by a both genre and score according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
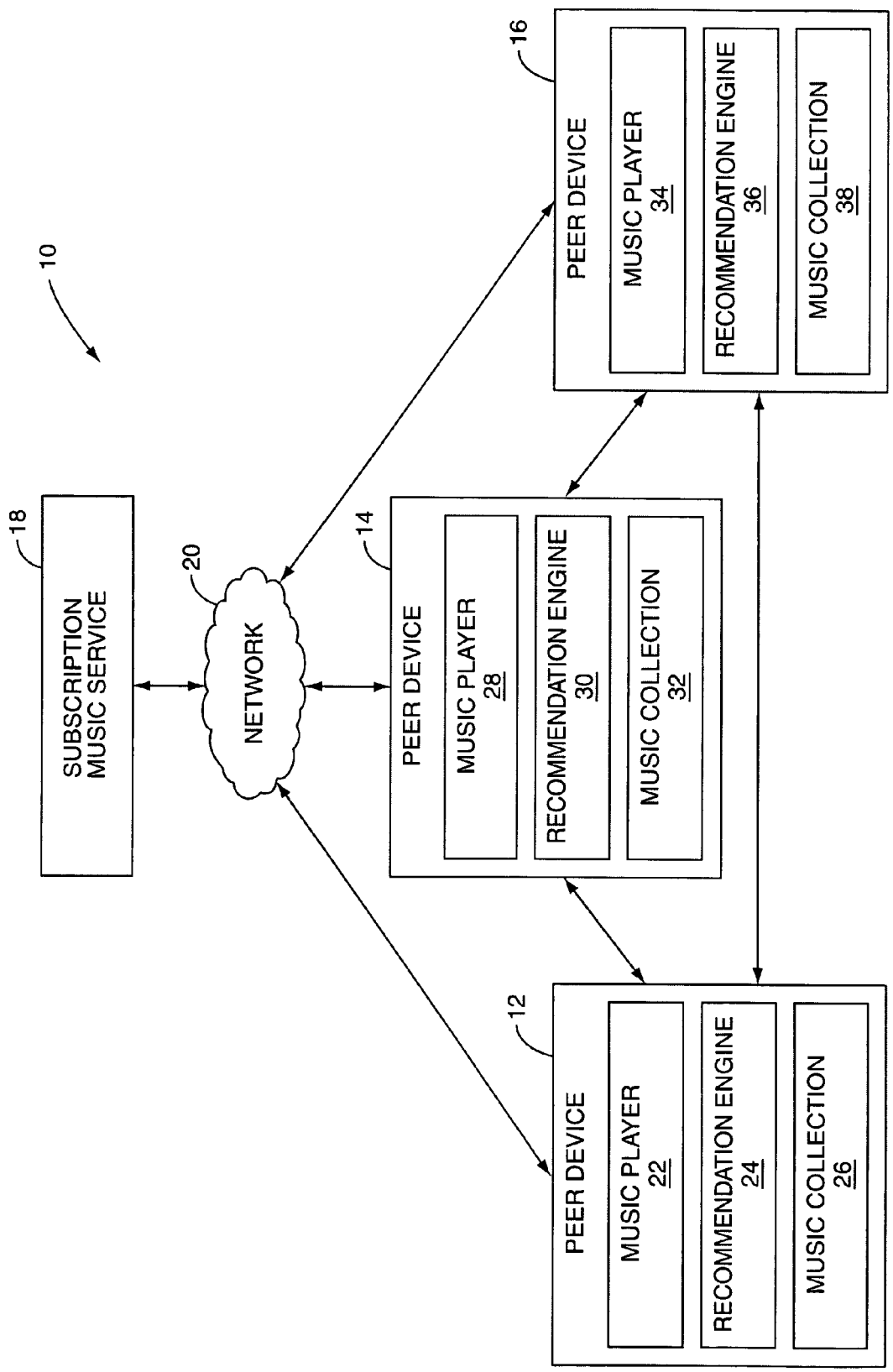
FIG. 1 illustrates a system incorporating a peer-to-peer (P2P) network for real time media recommendations according to one embodiment of the present invention.

FIG. 1 illustrates a system 10 incorporating a P2P network for providing real time song recommendations according to one embodiment of the present invention. Note that while the discussion herein focuses on song recommendations for clarity and ease of discussion, the present invention is equally applicable to providing recommendations for other types of media presentations such as video presentations, as will be apparent to one of ordinary skill in the art upon reading this disclosure. Exemplary video presentations are movies, television programs, and the like. In general, the system 10 includes a number of peer devices 12-16 which are optionally connected to a subscription music service 18 via a network 20, which may be a distributed public network such as, but not limited to, the Internet. Note that while three peer devices 12-16 are illustrated, the present invention may be used with any number of two or more peer devices.

In this embodiment, the peer devices 12-16 are preferably portable devices such as, but not limited to, portable audio players, mobile telephones, Personal Digital Assistants (PDAs), or the like having audio playback capabilities. However, the peer devices 12-16 may alternatively be stationary devices such as a personal computer or the like. The peer devices 12-16 include local wireless communication interfaces (FIG. 15) communicatively coupling the peer devices 12-16 to form a peer-to-peer (P2P) network. The wireless communication interfaces may provide wireless communication according to, for example, one of the suite of IEEE 802.11 standards, the Bluetooth standard, or the like.

The peer device 12 includes a music player 22, a recommendation engine 24, and a music collection 26. The music player 22 may be implemented in software, hardware, or a combination of hardware and software. In general, the music player 22 operates to play songs from the music collection 26. The recommendation engine 24 may be implemented in software, hardware, or a combination of hardware and software. The recommendation engine 24 may alternatively be incorporated into the music player 22. The music collection 26 includes any number of song files stored in one or more digital storage units such as, for example, one or more hard-disc drives, one or more memory cards, internal Random-Access Memory (RAM), one or more associated external digital storage devices, or the like.

In operation, each time a song is played by the music player 22, the recommendation engine 24 operates to provide a recommendation identifying the song to the other peer devices 14, 16 via the P2P network. The recommendation does not include the song. In one embodiment, the recommendation may be a recommendation file including information identifying the song. In addition, as discussed below in detail, the recommendation engine 24 operates to programmatically, or automatically, select a next song to be played by the music player 22 based on the recommendations received from the other peer device 14, 16 identifying songs recently played by the other peer devices 14, 16 and user preferences associated with the user of the peer device 12.

Like the peer device 12, the peer device 14 includes a music player 28, a recommendation engine 30, and a music collection 32, and the peer device 16 includes a music player 34, a recommendation engine 36, and a music collection 38.

The subscription music service 18 may be a service hosted by a server connected to the network 20. Exemplary subscription based music services that may be modified to operate according to the present invention are Yahoo! Music Unlimited digital music service and RealNetwork's Rhapsody digital music service.

Figure 2:
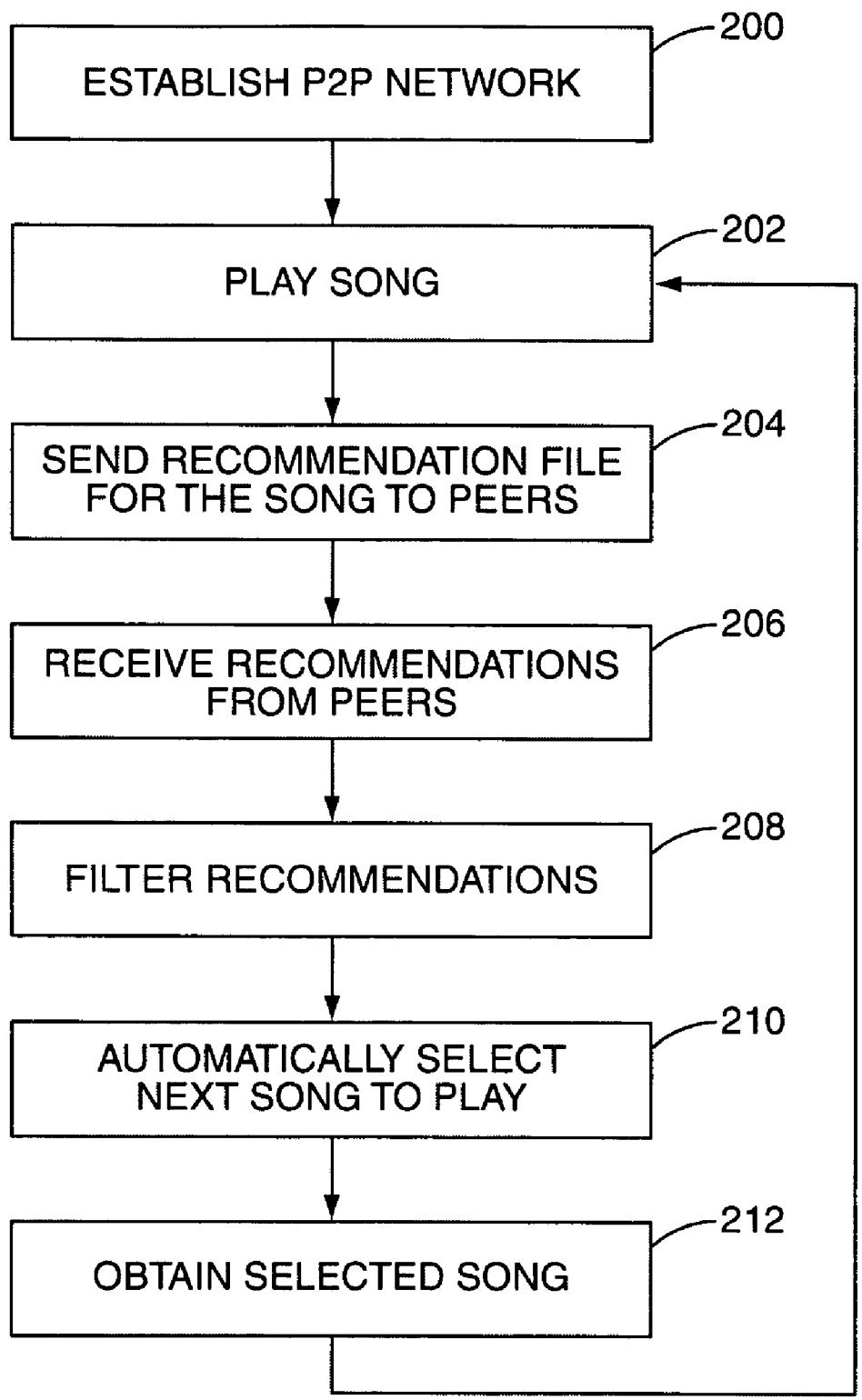
FIG. 2 is a flow chart illustrating the operation of the peer devices of FIG. 1 according to one embodiment of the present invention.

FIG. 2 illustrates the operation of the peer device 12 according to one embodiment of the present invention. However, the following discussion is equally applicable to the other peer devices 14, 16. First, the peer devices 12-16 cooperate to establish a P2P network (step 200). The P2P network may be initiated using, for example, an electronic or verbal invitation. Invitations may be desirable when the user wishes to establish the P2P network with a particular group of other users, such as his or her friends. Note that this may be beneficial when the user desires that the music he or she listens to be influenced only by the songs listened to by, for example, the user's friends. Invitations may also be desirable when the number of peer devices within a local wireless coverage area of the peer device 12 is large. As another example, the peer device 12 may maintain a "buddy list" identifying friends of the user of the peer device 12, where the peer device 12 may automatically establish a P2P network with the peer devices of the users identified by the "buddy list" when the peer devices are within a local wireless coverage area of the peer device 12.

Alternatively, the peer device 12 may establish an ad-hoc P2P network with the other peer devices 14, 16 by detecting the other peer devices 14, 16 within the local wireless coverage area of the peer device 12 and automatically establishing the P2P network with at least a subset of the detected peer devices 14, 16. In order to control the number of peer devices within the ad-hoc P2P network, the peer device 12 may compare user profiles of the users of the other peer devices 14, 16 with a user profile of the user of the peer device 12 and determine whether to permit the other peer devices 14, 16 to enter the P2P network based on the similarities of the user profiles.

At some point after the P2P network is established, the peer device 12 plays a song (step 202). Initially, before any recommendations have been received from the other peer devices 14, 16, the song may be a song from the music collection 26 selected by the user of the peer device 12. Prior to, during, or after playback of the song, the recommendation engine 24 sends a recommendation identifying the song to the other peer devices 14, 16 (step 204). The recommendation may include, but is not limited to, information identifying the song such as a Globally Unique Identifier (GUID) for the song, title of the song, or the like; a Uniform Resource Locator (URL) enabling other peer devices to obtain the song such as a URL enabling download or streaming of the song from the subscription music service 18 or a URL enabling purchase and download of the song from an e-commerce service; a URL enabling download or streaming of a preview of the song from the subscription music service 18 or a similar e-commerce service; metadata describing the song such as ID3 tags including, for example, genre, the title of the song, the artist of the song, the album on which the song can be found, the date of release of the song or album, the lyrics, and the like.

The recommendation may also include a list of recommenders including information identifying each user having previously recommended the song and a timestamp for each recommendation. For example, if the song was originally played at the peer device 14 and then played at the peer device 16 in response to a recommendation from the peer device 14, the list of recommenders may include information identifying the user of the peer device 14 or the peer device 14 and a timestamp identifying a time at which the song was played or recommended by the peer device 14, and information identifying the user of the peer device 16 or the peer device 16 and a timestamp identifying a time at which the song was played or recommended by the peer device 16. Likewise, if the peer device 12 then selects the song for playback, information identifying the user of the peer device 12 or the peer device 12 and a corresponding timestamp may be appended to the list of recommenders.

The peer device 12, and more specifically the recommendation engine 24, also receives recommendations from the other peer devices 14, 16 (step 206). The recommendations from the other peer devices 14, 16 identify songs played by the other peer devices 14, 16. Optionally, the recommendation engine 24 may filter the recommendations from the other peer devices 14, 16 based on, for example, user, genre, artist, title, album, lyrics, date of release, or the like (step 208).

The recommendation engine 24 then automatically selects a next song to play from the songs identified by the recommendations received from the other peer devices 14, 16, optionally songs identified by previously received recommendations, and one or more songs from the music collection 26 based on user preferences (step 210). In one embodiment, the recommendation engine 24 considers only those songs identified by recommendations received since a previous song selection. For example, if the song played in step 202 was a song selected by the recommendation engine 24 based on prior recommendations from the peer devices 14, 16, the recommendation engine 24 may only consider the songs identified in new recommendations received after the song was selected for playback in step 202 and may not consider the songs identified in the prior recommendations. This may be beneficial if the complexity of the recommendation engine 24 is desired to be minimal such as when the peer device 12 is a mobile terminal or the like having limited processing and memory capabilities. In another embodiment, the recommendation engine 24 may consider all previously received recommendations, where the recommendations may expire after a predetermined or user defined period of time.

As discussed below, the user preferences used to select the next song to play may include a weight or priority assigned to each of a number of categories such as user, genre, decade of release, and availability. Generally, availability identifies whether songs are stored locally in the music collection 26; available via the subscription music service 18; available for download, and optionally purchase, from an e-commerce service or one of the other peer devices 14, 16; or are not currently available where the user may search for the songs if desired. The user preferences may be stored locally at the peer device 12 or obtained from a central server via the network 20. If the peer device 12 is a portable device, the user preferences may be configured on an associated user system, such as a personal computer, and transferred to the peer device 12 during a synchronization process. The user preferences may alternatively be automatically provided or suggested by the recommendation engine 24 based on a play history of the peer device 12. In the preferred embodiment discussed below, the songs identified by the recommendations from the other peer devices 14, 16 and the songs from the music collection 26 are scored or ranked based on the user preferences. Then, based on the scores, the recommendation engine 24 selects the next song to play.

Once the next song to play is selected, the peer device 12 obtains the selected song (step 212). If the selected song is part of the music collection 26, the peer device 12 obtains the selected song from the music collection 26. If the selected song is not part of the music collection 26, the recommendation engine 24 obtains the selected song from the subscription music service 18, an e-commerce service, or one of the other peer devices 14, 16. For example, the recommendation for the song may include a URL providing a link to a source from which the song may be obtained, and the peer device 12 may obtain the selected song from the source identified in the recommendation for the song. Once obtained, the selected song is played and the process repeats (steps 202-212).

Figure 3:
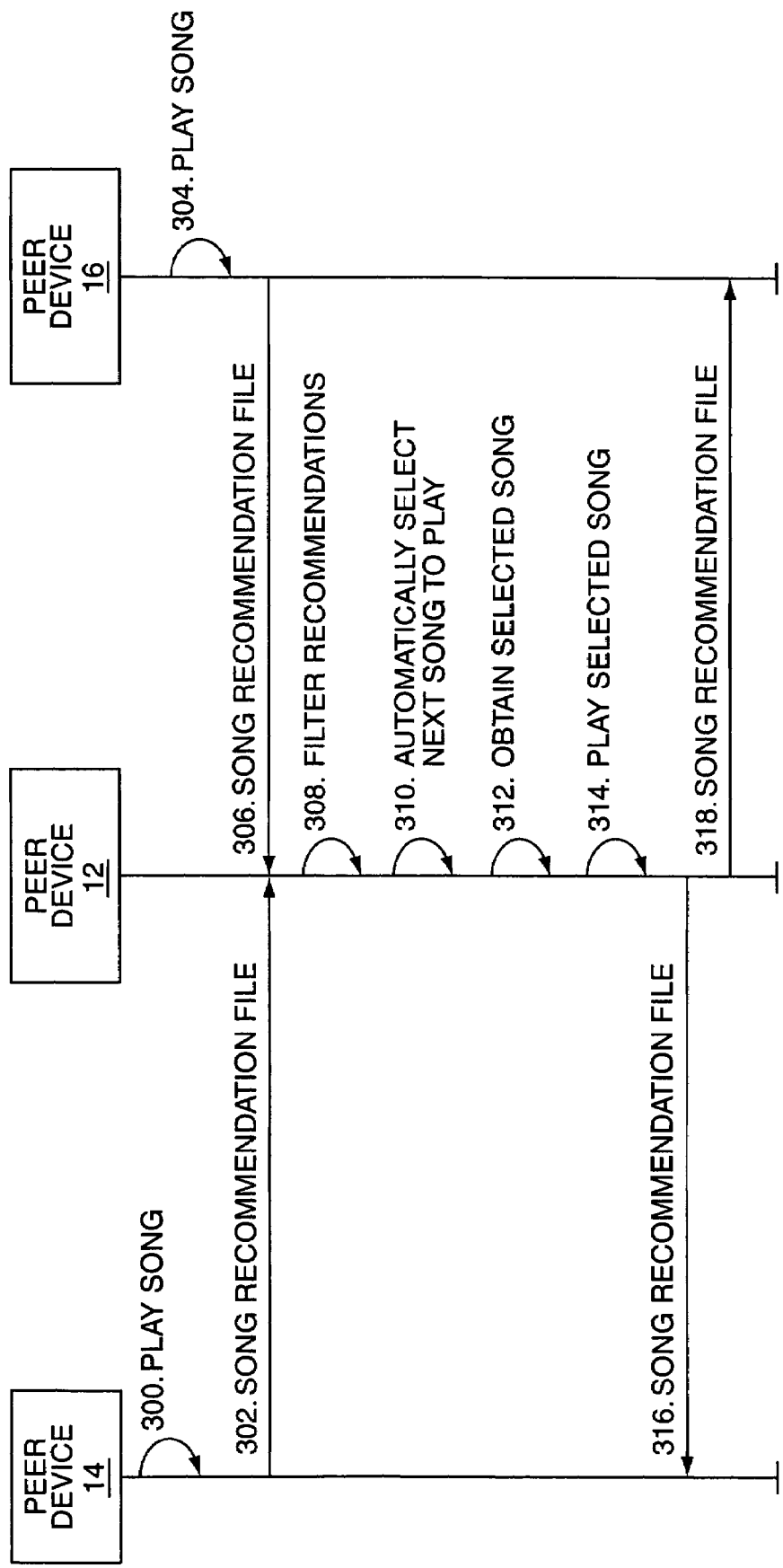
FIG. 3 illustrates the operation of the system of FIG. 1 according to one embodiment of the present invention.

FIG. 3 illustrates the operation of the peer devices 12-16 to provide real time song recommendations according to one embodiment of the present invention. The illustrated process is the same as discussed above with respect to FIG. 2. As such, the details will not be repeated. In general, the peer devices 14, 16 play songs and, in response, provide song recommendations to the peer device 12 (steps 300-306). The peer device 12 may optionally filter the recommendations from the peer devices 14, 16 (step 308). The recommendation engine 24 of the peer device 12 then automatically selects the next song to play from the songs identified by the recommendations, optionally songs identified by prior recommendations from the peer devices 14, 16, and locally stored songs from the music collection 26 based on user preferences of the user of the peer device 12 (step 310). The peer device 12 then obtains and plays the selected song (steps 312-314). Either prior to, during, or after playback of the selected song, the recommendation engine 24 of the peer device 12 provides a recommendation identifying the selected song to the other peer devices 14, 16 (step 316-318).

Figure 4:
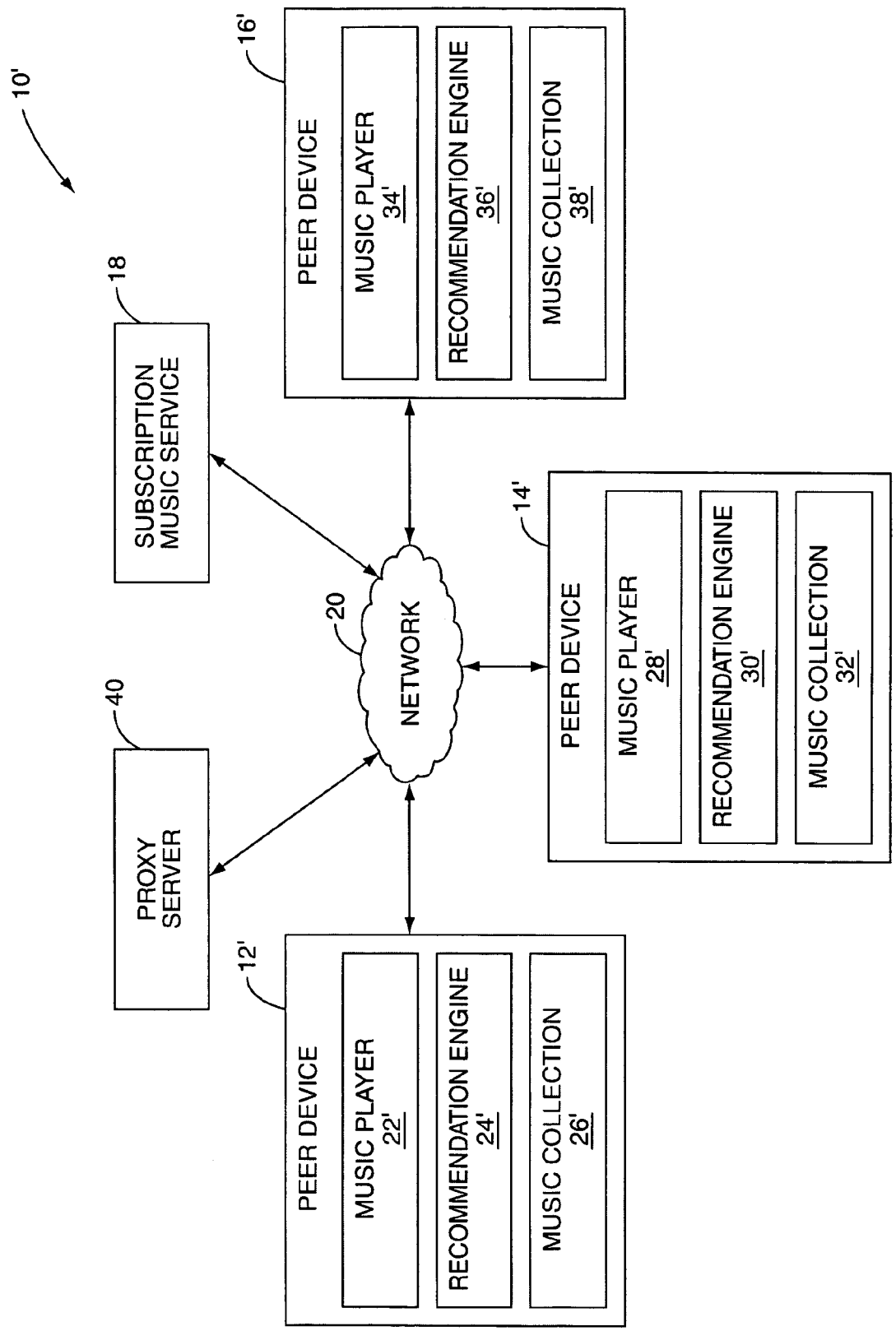
FIG. 4 illustrates a system incorporating a P2P network for real time media recommendations according to a second embodiment of the present invention.

FIG. 4 illustrates the system 10' according to second embodiment of the present invention. In this embodiment, the peer devices 12'-16' form a P2P network via the network 20 and a proxy server 40. The peer devices 12'-16' may be any device having a connection to the network 20 and audio playback capabilities. For example, the peer devices 12'-16' may be personal computers, laptop computers, mobile telephones, portable audio players, PDAs, or the like having either a wired or wireless connection to the network 20. As discussed above with respect to the peer device 12, the peer device 12' includes music player 22', a recommendation engine 24', and a music collection 26'. Likewise, the peer device 14' includes a music player 28', a recommendation engine 30', and a music collection 32', and the peer device 16' includes a music player 34', a recommendation engine 36', and a music collection 38'.

Figure 5:
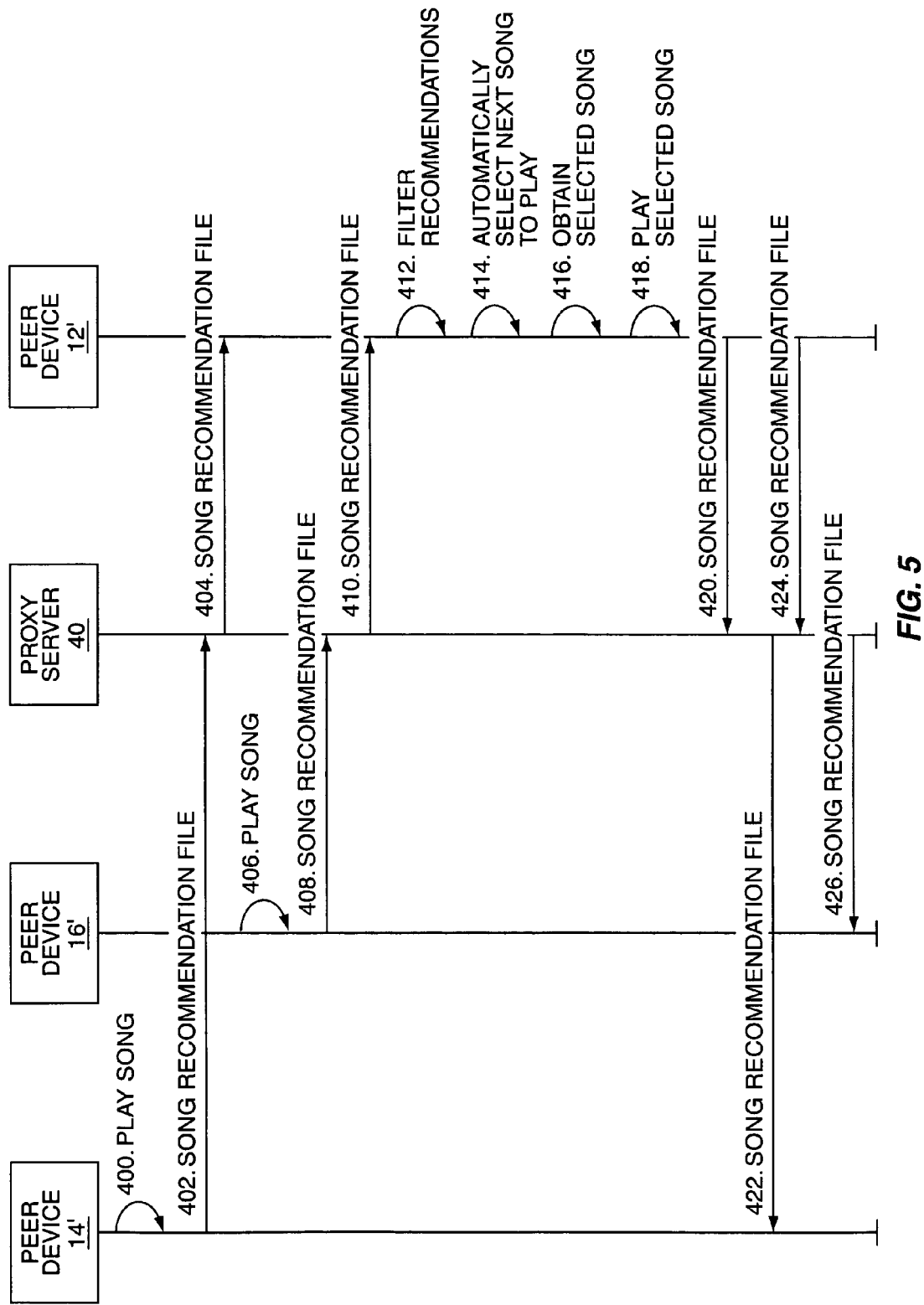
FIG. 5 illustrates the operation of the system of FIG. 4 according to one embodiment of the present invention.

FIG. 5 illustrates the operation of the system 10' of FIG. 4. Prior to beginning the process, the peer devices 12'-16' form a P2P network. Since the number of peer devices 12'-16' that may be connected to the network 20 may be very large, the peer devices 12'-16' may implement some technique for identifying a desired group of peer devices for the P2P network. For example, the P2P network may be initiated using, for example, an electronic or verbal invitation. As another example, the peer device 12' may maintain a "buddy list" identifying friends of the user of the peer device 12', where the peer device 12' may automatically establish a P2P network with the peer devices of the users identified by the "buddy list" when the peer devices are connected to the network 20. Alternatively, the peer devices 12'-16' may form an ad-hoc network where the participants for the ad-hoc network are selected based on similarities in user profiles.

In this example, once the P2P network is established, the peer device 14' plays a song and, in response, provides a song recommendation identifying the song to the peer device 12' via the proxy server 40 (steps 400-404). While not illustrated for clarity, the peer device 14' also sends the recommendation for the song to the peer device 16' via the proxy server 40. The peer device 16' also plays a song and sends a song recommendation to the peer device 12' via the proxy server 40 (steps 406-410). Again, while not illustrated for clarity, the peer device 16' also sends the recommendation for the song to the peer device 14' via the proxy server 40.

From this point, the process continues as discussed above. More specifically, the recommendation engine 24' may optionally filter the recommendations from the other peer devices 14', 16' based on, for example, user, genre, artist, title, album, lyrics, date of release, or the like (step 412). The recommendation engine 24' then automatically selects a next song to play from the songs identified by the recommendations received from the other peer devices 14'-16', optionally songs identified by previously received recommendations from the peer devices 14'-16', and one or more songs from the music collection 26' based on user preferences (step 414). In the preferred embodiment discussed below, the songs identified by the recommendations from the other peer devices 14'-16' and the songs from the music collection 26' are scored based on the user preferences. Then, based on the scores, the recommendation engine 24' selects the next song to play.

Once the next song to play is selected, the peer device 12' obtains the selected song (step 416). If the selected song is part of the music collection 26', the peer device 12' obtains the selected song from the music collection 26'. If the selected song is not part of the music collection 26', the recommendation engine 24' obtains the selected song from the subscription music service 18, an e-commerce service, or one of the other peer devices 14'-16'. For example, the selected song may be obtained from a source identified in the recommendation for the song. Once obtained, the selected song is played and a recommendation for the song is provided to the other peer devices 14'-16' via the proxy server 40 (steps 418-426).

Figure 6:
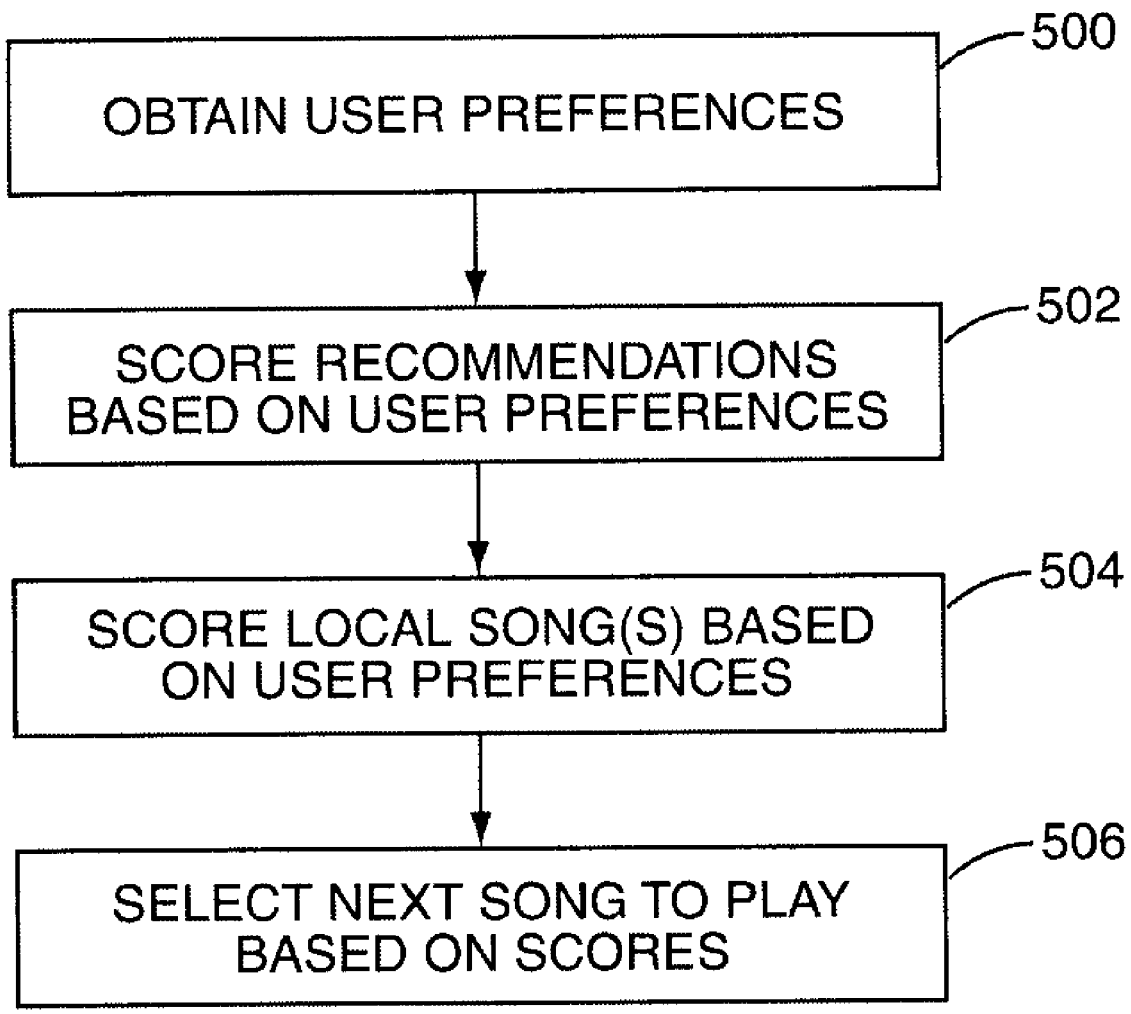
FIG. 6 is a flow chart illustrating a method for automatically selecting media to play based on recommendations from peer devices and user preferences according to one embodiment of the present invention.

FIG. 6 illustrates the process of automatically selecting a song to play from the received recommendations and locally stored songs at the peer device 12' according to one embodiment of the present invention. However, the following discussion is equally applicable to the peer devices 12-16 of FIG. 1, as well as the other peer devices 14'-16' of FIG. 4. First, the user preferences for the user of the peer device 12' are obtained (step 500). The user preferences may include a weight or priority assigned to each of a number of categories such as, but not limited to, user, genre, decade of release, and availability. The user preferences may be obtained from the user during an initial configuration of the recommendation engine 24'. In addition, the user preferences may be updated by the user as desired. The user preferences may alternatively be suggested by the recommendation engine 24' or the proxy server 40 based on a play history of the peer device 12'. Note that that proxy server 40 may ascertain the play history of the peer device 12' by monitoring the recommendations from the peer device 12' as the recommendations pass through the proxy server 40 on their way to the other peer devices 14'-16'. The user preferences may be stored locally at the peer device 12' or obtained from a central server, such as the proxy server 40, via the network 20.

Once recommendations are received from the other peer devices 14'-16', the recommendation engine 24' of the peer device 12' scores the songs identified by the recommendations based on the user preferences (step 502). The recommendation engine 24' also scores one or more local songs from the music collection 26' (step 504). The recommendation engine 24' then selects the next song to play based, at least on part, on the scores of the recommended and local songs (step 506).

Figure 7:
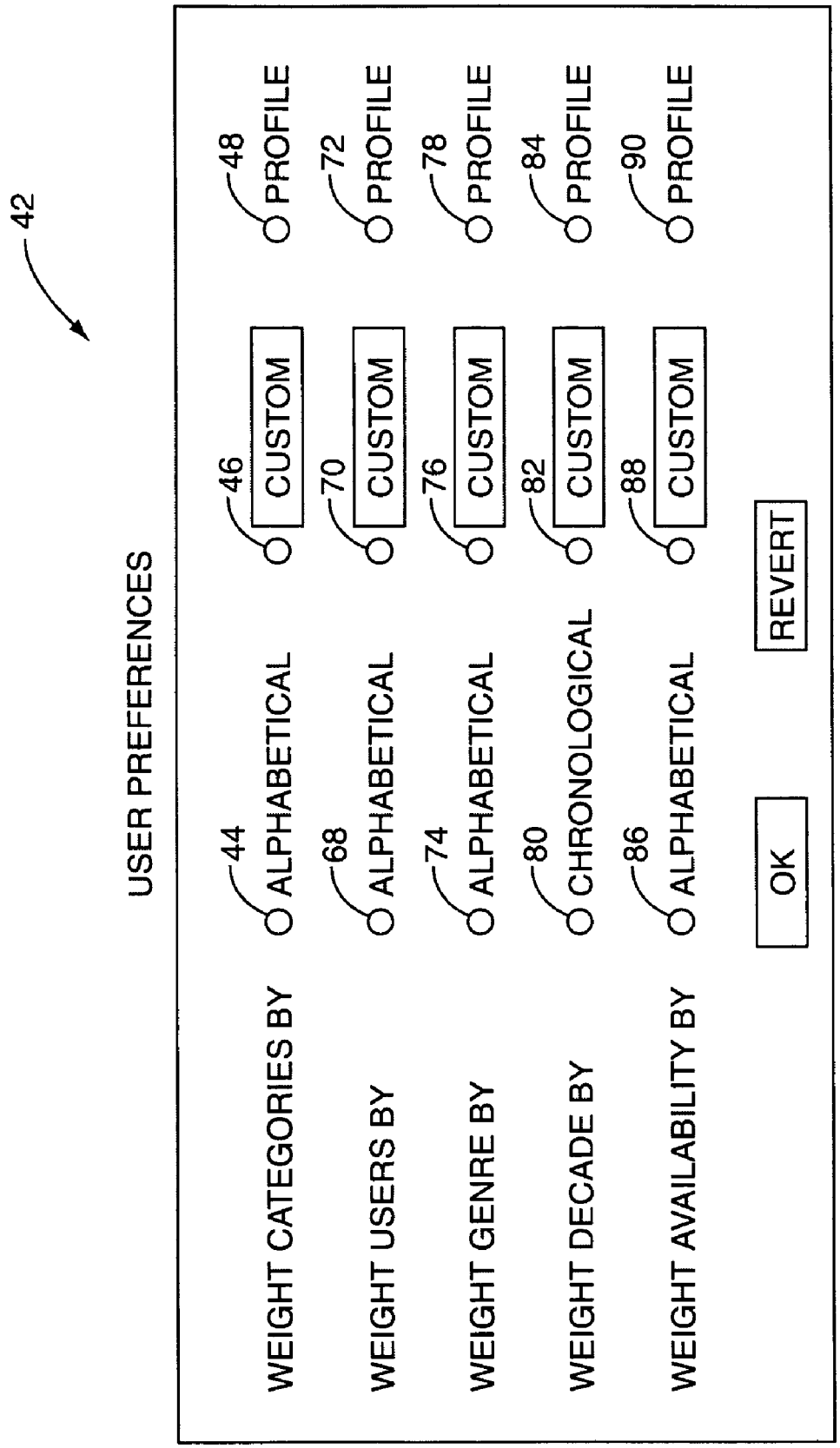
FIG. 7 illustrates an exemplary graphical user interface (GUI) for configuring user preferences according to one embodiment of the present invention.
Figure 8:
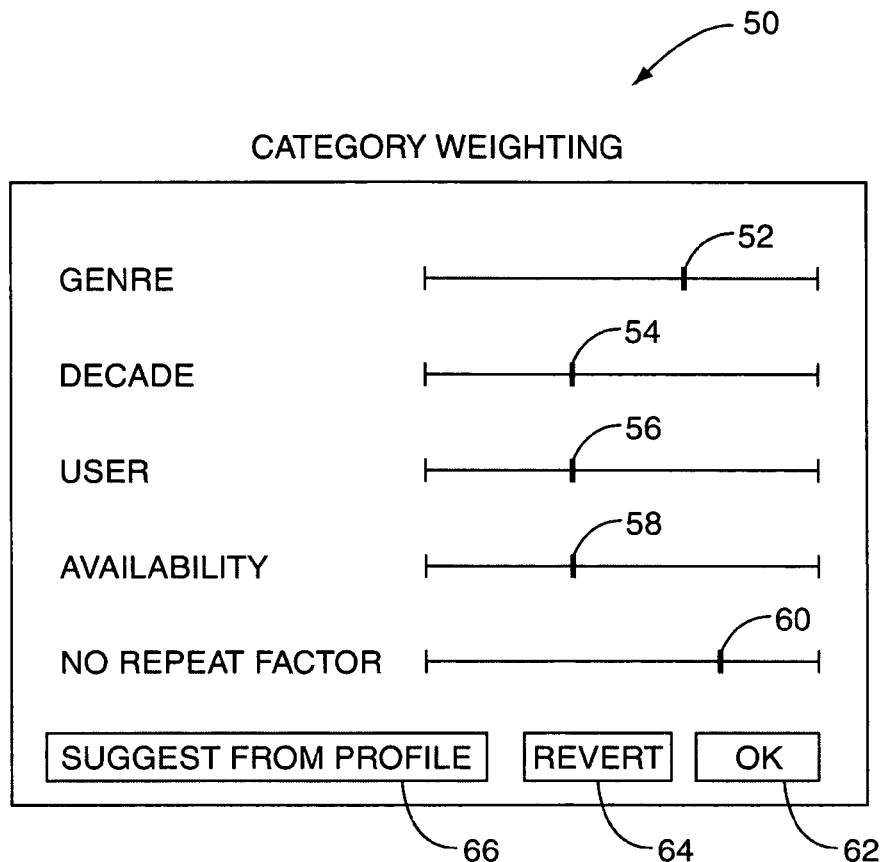
FIG. 8 illustrates an exemplary GUI for assigning weights to various categories of media content as part of configuring the user preferences according to one embodiment of the present invention.

FIG. 7 illustrates an exemplary graphical user interface (GUI) 42 for configuring user preferences. First, the user assigns a weight to various categories. In this example, the categories are users, genre, decade, and availability. However, the present invention is not limited thereto. The weights for the categories may be assigned alphabetically by selecting radio button 44, customized by the user by selecting radio button 46, or automatically suggested based on a user profile of the user by selecting radio button 48. If alphabetical weighting is selected, the weights are assigned by alphabetically sorting the categories and assigning a weight to each of the categories based on its position in the alphabetically sorted list of categories. As illustrated in FIG. 8, if customized weighting is selected, the user may be presented with a GUI 50 for customizing the weighting of the categories. As illustrated in the exemplary embodiment of FIG. 8, the weights of the categories may be assigned by adjusting corresponding sliding bars 52-58. Sliding bar 60 may be adjusted to assign a weight to a "no repeat factor." The no repeat factor is a dampening factor used to alter a song's score based on when the song was previously played at the peer device 12' in order to prevent the same song from being continually repeated.

Once the weights are assigned, the user may select an OK button 62 to return to the GUI 42 of FIG. 7 or select a REVERT button 64 to return the weights of the categories to their previous settings. In addition, the user may select a SUGGEST FROM PROFILE button 66 to have the recommendation engine 24' or the proxy server 40 suggest weights for the categories based on a user profile. Note that the button 66 has the same effect as the radio button 48 of FIG. 7.

Returning to FIG. 7, radio buttons 68-72 are used to select a desired method for assigning weights to each user in the P2P network, radio buttons 74-78 are used to select a desired method for assigning weights to each of a number of genres of music, radio buttons 80-84 are used to select the desired method for assigning weights to each of a number of decades, and radio buttons 86-90 are used to select the desired method for assigning weights to a number of song availability types.

Figure 9:
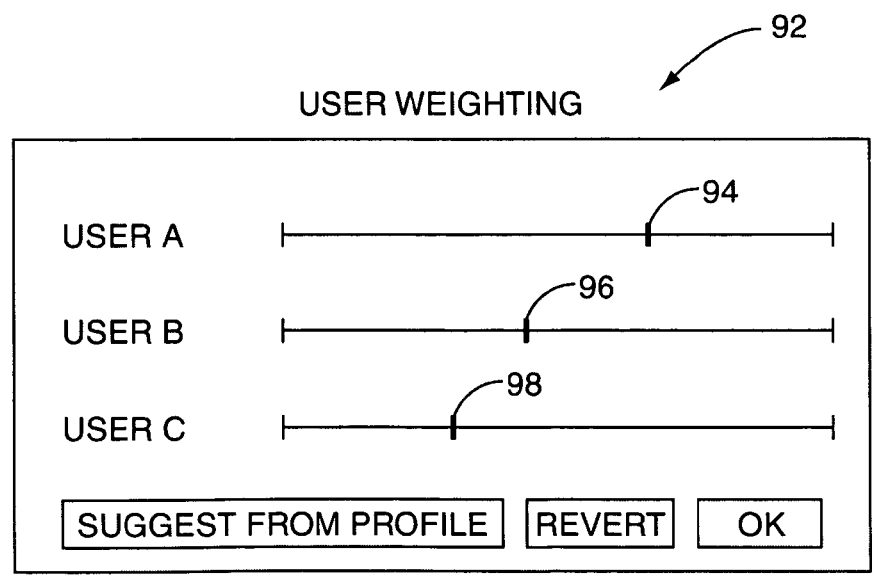
FIG. 9 illustrates an exemplary GUI for assigning weights to individual users within a user category as part of configuring the user preferences according to one embodiment of the present invention.

Regarding users, if the radio button 68 is selected, the users are assigned weights based on their respective positions in an alphabetically sorted list of users. If the radio button 70 is selected, a GUI 92 (FIG. 9) enabling the user to customize the weights assigned to a number of users from which recommendations are received. An exemplary embodiment of the GUI 92 is illustrated in FIG. 9, where sliding bars 94-98 enable the user to assign customized weights to corresponding users. Returning to FIG. 7, if the radio button 72 is selected, the recommendation engine 24' or the proxy server 40 generates suggested weights for the users based on a user profile associated with the peer device 12'.

Figure 10:
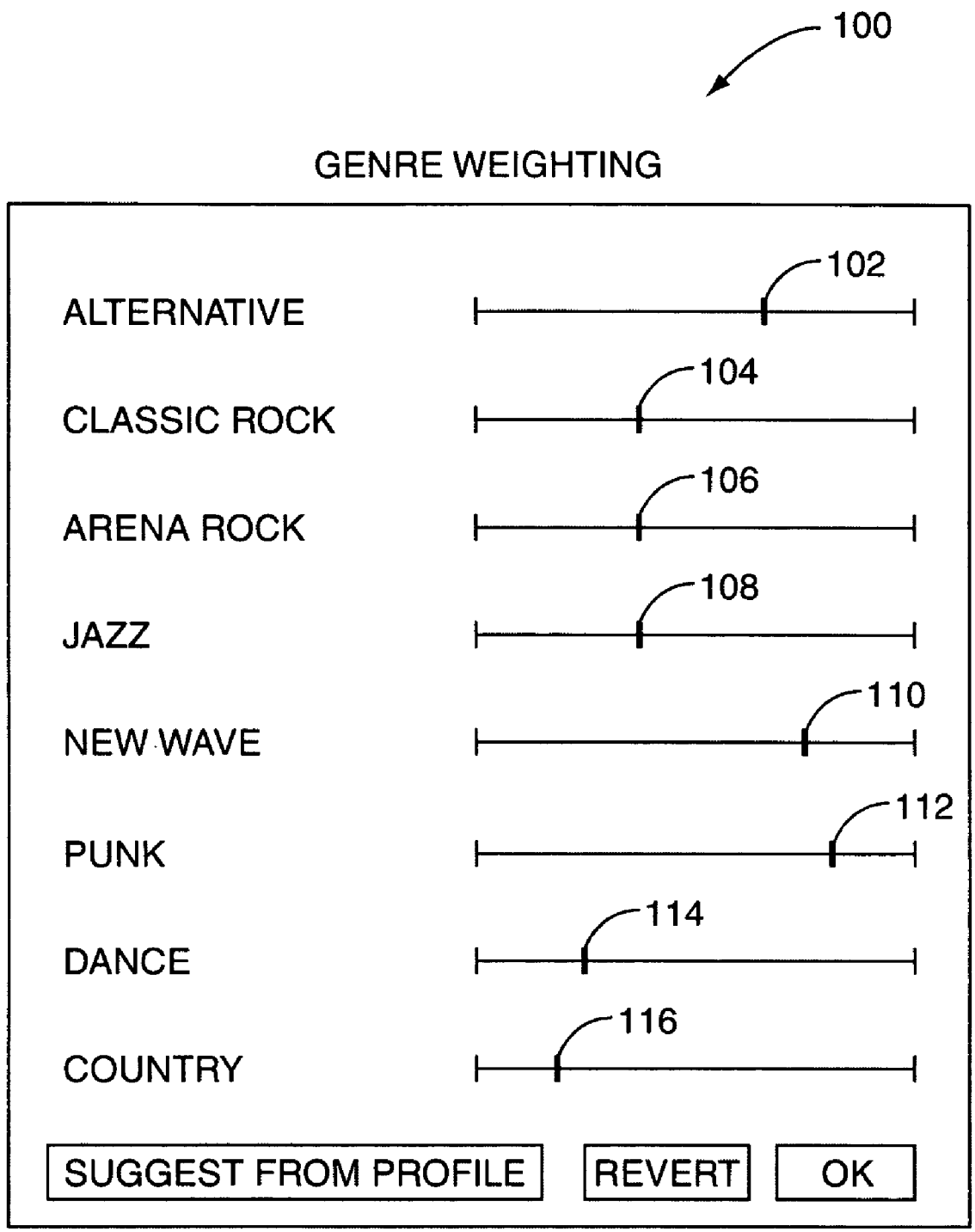
FIG. 10 illustrates an exemplary GUI for assigning weights to individual genres from a genre category as part of configuring the user preferences according to one embodiment of the present invention.

Regarding genres, if the radio button 74 is selected, the genres are assigned weights based on their respective positions in an alphabetically sorted list of genres. If the radio button 76 is selected, a GUI 100 (FIG. 10) enabling the user to customize the weights assigned to a number of genres. An exemplary embodiment of the GUI 100 is illustrated in FIG. 10, where sliding bars 102-116 enable the user to assign customized weights to corresponding genres. Returning to FIG. 7, if the radio button 78 is selected, the recommendation engine 24' or the proxy server 40 generates suggested weights for the genres based on a user profile associated with the peer device 12'.

Figure 11:
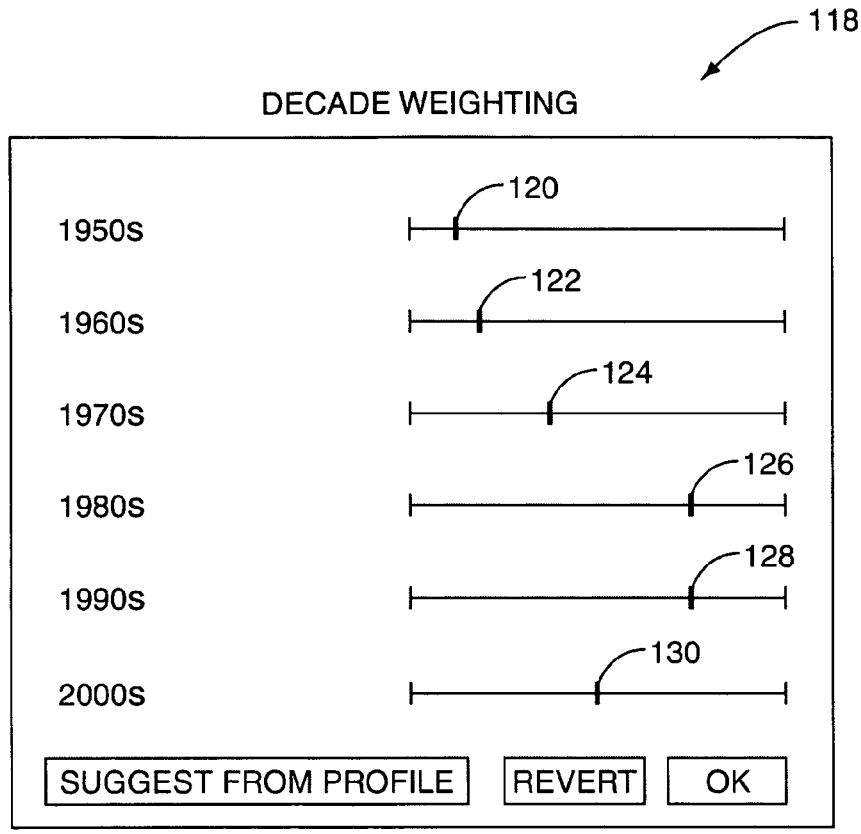
FIG. 11 illustrates an exemplary GUI for assigning weights to individual decades from a decade category as part of configuring the user preferences according to one embodiment of the present invention.

Regarding decades, if the radio button 80 is selected, the decades are assigned weights based on their respective positions in a chronologically sorted list of decades. If the radio button 82 is selected, a GUI 118 (FIG. 11) enabling the user to customize the weights assigned to a number of decades. An exemplary embodiment of the GUI 118 is illustrated in FIG. 11, where sliding bars 120-130 enable the user to assign customized weights to corresponding decades. Returning to FIG. 7, if the radio button 84 is selected, the recommendation engine 24' or the proxy server 40 generates suggested weights for the decades based on a user profile associated with the peer device 12'.

Figure 12:
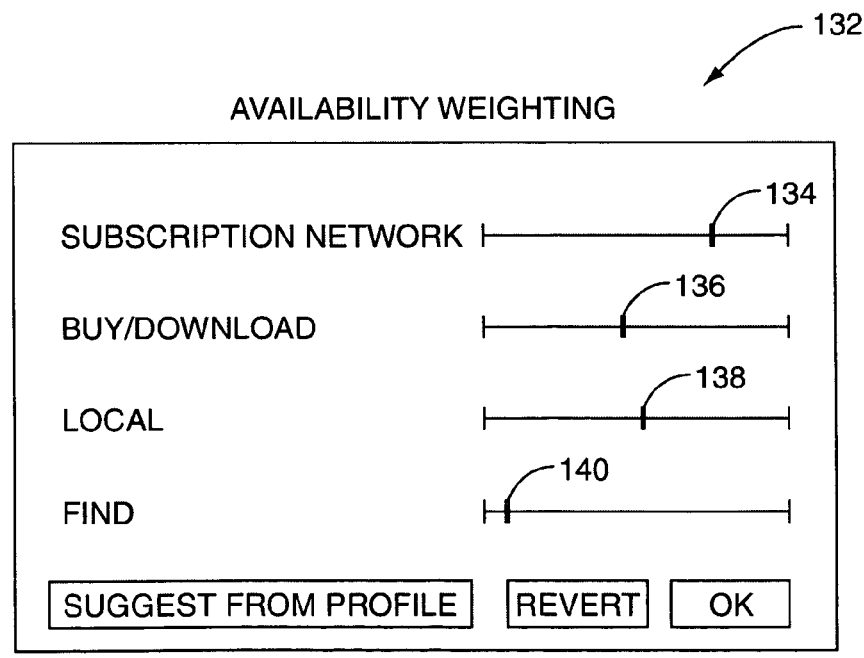
FIG. 12 illustrates an exemplary GUI for assigning weights to individual availability types from an availability type category as part of configuring the user preferences according to one embodiment of the present invention.

Regarding availability, if the radio button 86 is selected, the availability types are assigned weights based on their respective positions in an alphabetically sorted list of availability types. If the radio button 88 is selected, a GUI 132 (FIG. 12) enabling the user to customize the weights assigned to a number of availability types. An exemplary embodiment of the GUI 132 is illustrated in FIG. 12, where sliding bars 134-140 enable the user to assign customized weights to corresponding availability types. Returning to FIG. 7, if the radio button 90 is selected, the recommendation engine 24' or the proxy server 40 generates suggested weights for the availability types based on a user profile associated with the peer device 12'.

An exemplary equation for scoring a particular song is:

Score=$NRF \cdot (WU \cdot WUA + WG \cdot WGA + WD \cdot WDA + WA \cdot WAA) \cdot 100$, where NRF is the "no repeat factor"; WU is the weight assigned to the user category; WUA is the weight assigned to the user attribute of the song, which is the user recommending the song; WG is the weight assigned to the genre category; WGA is the weight assigned to the genre attribute of the song, which is the genre of the song; WD is the weight assigned to the decade category; WDA is the weight assigned to the decade attribute of the song, which is the decade in which the song or the album associated with the song was released; WA is the weight assigned to the availability category; and WAA is the weight assigned to the availability attribute of the song, which is the availability of the song.

The NRF may, for example, be computed as:

$$NRF = \frac{\text{MIN}(10 \cdot NRFW, \text{LASTREPEAT\_INDEX})}{10 \cdot NRFW}.$$

As an example, assume that the following category weights have been assigned:

| | |
|---|---|
| User Category | 1 |
| Genre Category | 7 |
| Decade Category | 7 |
| Availability Type Category | 5 |
| NRFW | 9 |

Further assume that the attributes for the categories have been assigned weights as follows:

| User | | Genre | | Decade | | Availability | |
|---|---|---|---|---|---|---|---|
| User A | 5 | Alternative | 8 | 1950s | 2 | Local | 8 |
| User B | 5 | Classic Rock | 5 | 1960s | 4 | Subscription Network | 2 |
| User C | 5 | Arena Rock | 5 | 1970s | 7 | Buy/Download | 1 |
| | | Jazz | 5 | 1980s | 9 | Find | 1 |
| | | New Wave | 2 | 1990s | 5 | | |
| | | Punk | 4 | 2000s | 5 | | |
| | | Dance | 2 | | | | |
| | | Country | 2 | | | | |

Thus, if a particular song to be scored is recommended by the user "User C," is from the "Alternative Genre," is from the "1980s" decade, and is available from the subscription music service 18, the score of the song may be computed as:

$$\text{Score} = NRF \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100$$

where if the song was last played 88 songs ago, $$NRF = \frac{\text{MIN}(10 \cdot 9, 88)}{10 \cdot 9} = \frac{88}{90}.$$

Thus, the score for the song is $$\text{Score} = \frac{88}{90} \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100 = 65.5.$$

FIG. 13 is an exemplary GUI 142 showing a playlist for the peer device 12' including both local and recommended songs according to the present invention. However, note that a similar list may be maintained internally by the peer device 12 of FIG. 1 and potentially optimized to display at least a portion of the GUI 142 on the display of the peer device 12. In this example, both the local and recommended songs are scored, as described above, and sorted according to their scores. In addition, as illustrated in FIG. 14, the songs may be sorted based on another criterion, which in the illustrated example is genre, and score.

The GUI 142 may optionally allow the user to block songs having particular identified fields. In the examples of FIGS. 13 and 14, the user has identified the genre "country" and the artist "iron maiden" as fields to be blocked, as illustrated by the underlining. The user may select fields to block by, for example, clicking on or otherwise selecting the desired fields. Songs having the blocked fields are still scored but are not obtained or played by the peer device 12'.

In one embodiment, the recommendation engine 24' of the peer device 12' may provide a download queue containing all songs to be downloaded, and optionally purchased, from an external source such as the subscription music service 18, an e-commerce service, or another peer device 14'-16'. Songs in the download queue having scores above a first predetermined or user defined threshold and previews of other songs in the download queue having scores above a second predetermined or user defined threshold but below the first threshold may be automatically downloaded to the peer device 12'.

Figure 15:
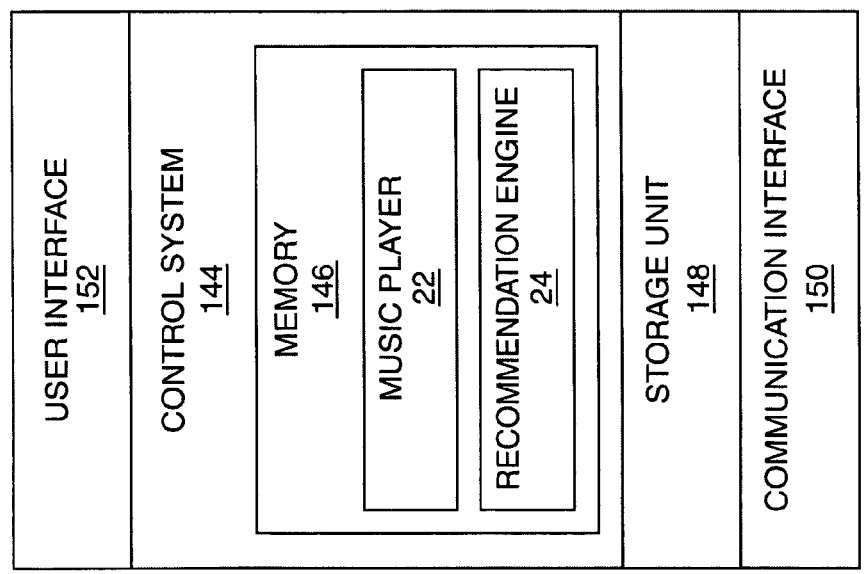
FIG. 15 is a block diagram of a peer device of FIG. 1 according to one embodiment of the present invention.

FIG. 15 is a block diagram of an exemplary embodiment of the peer device 12 of FIG. 1. However, the following discussion is equally applicable to the other peer devices 14, 16. In general, the peer device 12 includes a control system 144 having associated memory 146. In this example, the music player 22 and the recommendation engine 24 are at least partially implemented in software and stored in the memory 146. The peer device 12 also includes a storage unit 148 operating to store the music collection 26 (FIG. 1). The storage unit 148 may be any number of digital storage devices such as, for example, one or more hard-disc drives, one or more memory cards, RAM, one or more external digital storage devices, or the like. The music collection 26 may alternatively be stored in the memory 146. The peer device 12 also includes a communication interface 150. The communication interface 150 includes a local wireless communication interface for establishing the P2P network with the other peer devices 14, 16. The local wireless interface may operate according to, for example, one of the suite of IEEE 802.11 standards, the Bluetooth standard, or the like. The communication interface 150 may also include a network interface communicatively coupling the peer device 12 to the network 20 (FIG. 1). The peer device 12 also includes a user interface 152, which may include components such as a display, speakers, a user input device, and the like.

Figure 16:
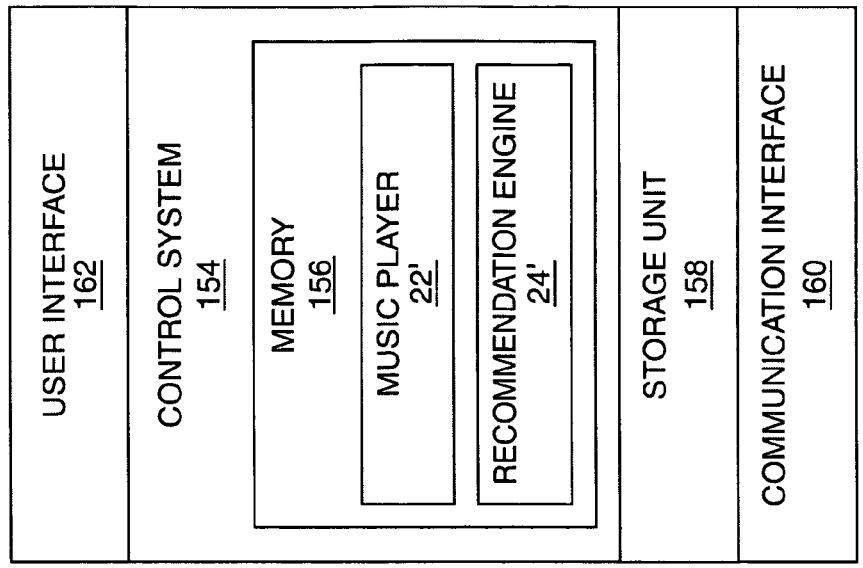
FIG. 16 is a block diagram of a peer device of FIG. 4 according to one embodiment of the present invention.

FIG. 16 is a block diagram of an exemplary embodiment of the peer device 12' of FIG. 4. However, the following discussion is equally applicable to the other peer devices 14'-16'. In general, the peer device 12' includes a control system 154 having associated memory 156. In this example, the music player 22' and the recommendation engine 24' are at least partially implemented in software and stored in the memory 156. The peer device 12' also includes a storage unit 158 operating to store the music collection 26' (FIG. 4). The storage unit 158 may be any number of digital storage devices such as, for example, one or more hard-disc drives, one or more memory cards, RAM, one or more external digital storage devices, or the like. The music collection 26' may alternatively be stored in the memory 156. The peer device 12' also includes a communication interface 160. The communication interface 160 includes a network interface communicatively coupling the peer device 12' to the network 20 (FIG. 4). The peer device 12' also includes a user interface 162, which may include components such as a display, speakers, a user input device, and the like.

The present invention provides substantial opportunity for variation without departing from the spirit or scope of the present invention. For example, while FIG. 1 illustrates the peer devices 12-16 forming the P2P network via local wireless communication and FIG. 4 illustrates the peer devices 12'-16' forming the P2P network via the network 20, the present invention is not limited to either a local wireless P2P network or a WAN P2P network in the alternative. More specifically, a particular peer device, such as the peer device 12, may form a P2P network with other peer devices using both local wireless communication and the network 20. Thus, for example, the peer device 12 may receive recommendations from both the peer devices 14, 16 (FIG. 1) via local wireless communication and from the peer devices 14'-16' (FIG. 4) via the network 20.

As another example, while the discussion herein focuses on song recommendations, the present invention is not limited thereto. The present invention is equally applicable to recommendations for other types of media presentations such as video presentations. Thus, the present invention may additionally or alternatively provide movie recommendations, television program recommendations, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:

receiving, by a peer device, a plurality of media recommendations from a plurality of recommending peer devices in a peer-to-peer (P2P) network,
wherein:
the plurality of media recommendations identify a plurality of media presentations such that each of the plurality of media recommendations identifies a corresponding one of the plurality of media presentations, and
each media recommendation of the plurality of media recommendations is automatically sent from a corresponding one of the plurality of recommending peer devices in response to the media presentation identified by the media recommendation being played on the corresponding one of the plurality of recommending peer devices;

automatically adding the plurality of media presentations identified by the plurality of media recommendations to a pre-existing list of media presentations,
wherein:
the pre-existing list of media presentations is stored on the peer device and includes two or more media presentations,
each media presentation included in the pre-existing list of media presentations is scored, and
the plurality of media presentations are added to the pre-existing list of media presentations based on the plurality of media recommendations as the plurality of media recommendations are received from the plurality of recommending peer devices to provide an updated list of media presentations;

automatically selecting a media presentation to play on the peer device from the updated list of media presentations based on user preferences, wherein:
automatically selecting the media presentation to play comprises:
scoring each media presentation of the plurality of media presentations identified by the plurality of media recommendations based on the user preferences, and
automatically selecting the media presentation to play from the undated list of media presentations based on scores assigned to the media presentations in the undated list of media presentations; and
playing the selected media presentation on the peer devices.

2. The method of claim 1 wherein the plurality of media recommendations are a plurality of song recommendations that identify songs and are received in response to the songs being played on the plurality of recommending peer devices.

3. The method of claim 1 wherein the pre-existing list of media presentations comprises at least one media presentation from a local media collection.

4. The method of claim 1 wherein the pre-existing list of media presentations comprises media presentations identified by previously received media recommendations from the plurality of recommending peer devices received prior to receipt of the plurality of media recommendations.

5. The method of claim 1 wherein the pre-existing list of media presentations comprises media presentations identified by previously received media recommendations from the plurality of recommending peer devices received prior to receipt of the plurality of media recommendations and at least one media presentation from a local media collection.

6. The method of claim 1 wherein the user preferences comprise weights assigned to a plurality of categories and scoring each media presentation of the plurality of media presentations identified by the plurality of media recommendations comprises scoring each media presentation of the plurality of media presentations identified by the plurality of media recommendations based on the weights assigned to the plurality of categories.

7. The method of claim 6 wherein the plurality of categories comprise one or more categories selected from a group consisting of user, genre, decade, and availability.

8. The method of claim 6 wherein the user preferences further comprise weights assigned to a plurality of possible attributes for each of the plurality of categories and scoring each media presentation of the plurality of media presentations identified by the plurality of media recommendations comprises scoring each media presentation of the plurality of media presentations identified by the plurality of media recommendations based on the weights assigned to the plurality of categories and the weights assigned to the plurality of possible attributes for each of the plurality of categories.

9. The method of claim 1 wherein the user preferences comprise a weight assigned to a no repeat factor and scoring each media presentation of the plurality of media presentations identified by the plurality of media recommendations comprises scoring each media presentation of the plurality of media presentations identified by the plurality of media recommendations based on the no repeat factor and the weight assigned to the no repeat factor.

10. The method of claim 1 further comprising obtaining the user preferences from a user.

11. The method of claim 1 further comprising automatically generating the user preferences based on an associated play history.

12. The method of claim 1 wherein automatically selecting the media presentation to play from the updated list of media presentations based on the scores comprises:
sorting the updated list of media presentations based on the scores to provide a sorted list of media presentations; and
automatically selecting a media presentation from the sorted list of media presentations having a most preferred score as the media presentation to play.

13. The method of claim 1 further comprising automatically obtaining the selected media presentation from a subscription service.

14. The method of claim 1 further comprising automatically purchasing and downloading the selected media presentation from an e-commerce service.

15. The method of claim 1 further comprising automatically obtaining a preview of the selected media presentation from an e-commerce service, wherein playing the selected media presentation comprises playing the preview of the selected media presentation.

16. The method of claim 1 further comprising automatically obtaining the selected media presentation from one of the plurality of recommending peer devices.

17. The method of claim 1 further comprising automatically obtaining a preview of the selected media presentation from one of the plurality of recommending peer devices, wherein playing the selected media presentation comprises playing the preview of the selected media presentation.

18. The method of claim 1 further comprising:
inserting information identifying one or more of the media presentations identified by the plurality of media recommendations in a download queue, wherein media presentations in the download queue are scored based on the user preferences;
identifying one or more media presentations in the download queue that are scored above a first predetermined threshold;
automatically obtaining the one or more media presentations in the download queue that are scored above the first predetermined threshold from an external source;
identifying one or more media presentations in the download queue that are scored above a second predetermined threshold and below the first predetermined threshold; and
automatically obtaining previews of the one or more media presentations in the download queue that are scored above the second predetermined threshold and below the first predetermined threshold from the external source.

19. The method of claim 1 further comprising:
filtering the plurality of media recommendations based on the user preferences to provide filtered media recommendations;
wherein automatically adding comprises automatically adding media presentations identified by the filtered media recommendations to the pre-existing list of media presentations to provide the updated list of media presentations.

20. The method of claim 1 further comprising establishing the P2P network via local wireless communication.

21. The method of claim 1 further comprising establishing the P2P network via a Wide Area Network (WAN).

22. The method of claim 1 further comprising inviting the plurality of recommending peer devices to join the P2P network.

23. The method of claim 1 wherein receiving the plurality of media recommendations from the plurality of recommending peer devices in the P2P network further comprises receiving the plurality of media recommendations via a proxy server.

24. The method of claim 23 wherein the user preferences are stored at the proxy server.

25. The method of claim 1 wherein the user preferences are stored at a proxy server.

26. The method of claim 1 further comprising establishing the P2P network over a Wide Area Network (WAN) via a proxy server.

27. The method of claim 1 further comprising automatically providing a media recommendation identifying the selected media presentation to the plurality of recommending peer devices in response to playing the selected media presentation.

28. The method of claim 1 wherein each of the plurality of recommending peer devices is associated with one of a plurality of recommending users, and the user preferences comprise weights assigned to the plurality of recommending users.

29. The method of claim 1 wherein the user preferences comprise weights assigned to a plurality of media presentation attributes.

30. The method of claim 29 wherein the plurality of media presentation attributes comprise at least one of a group consisting of: a plurality of music genres and a plurality of time periods.

31. A peer device for a peer-to-peer (P2P) media recommendation system comprising:
    a communication interface communicatively coupling the peer device to a plurality of other peer devices in a P2P network; and
    a control system associated with the communication interface and adapted to:
        receive a plurality of media recommendations from the plurality of other peer devices,
            wherein:
                the plurality of media recommendations identify a plurality of media presentations such that each of the plurality of media recommendations identifies a corresponding one of the plurality of media presentations, and
                each media recommendation of the plurality of media recommendations is automatically sent from a corresponding one of the plurality of other peer devices in response to the media presentation identified by the media recommendation being played on the corresponding one of the plurality of other peer devices;
        automatically add the plurality of media presentations identified by the plurality of media recommendations to a pre-existing list of media presentations,
            wherein:
                the pre-existing list of media presentations is stored on the peer device and includes two or more media presentations,
                each media presentation in the pre-existing list of media presentations is scored, and
                the plurality of media presentations are added to the pre-existing list of media presentations based on the plurality of media presentations as the plurality of media recommendations are received from the plurality of other peer devices to provide an updated list of media presentations;
        automatically select a media presentation to play on the peer device from the updated list of media presentations based on user preferences,
            wherein automatically selecting the media presentation to play comprises:
                scoring each media presentation of the plurality of media presentations identified by the plurality of media recommendations based on the user preferences, and
                automatically selecting the media presentation to play from the updated list of media presentations based on scores assigned to the media presentations in the updated list of media presentations; and
        play the selected media presentation on the peer device.

32. The peer device of claim 31 wherein the plurality of media recommendations identify songs played by the plurality of other peer devices.

33. The peer device of claim 31 wherein the pre-existing list of media presentations comprises at least one media presentation from a local media collection of the peer device.

34. The peer device of claim 31 wherein if the selected media presentation is not included within a local media collection associated with the peer device, the control system is further adapted to automatically obtain the selected media presentation from an external source.

35. The peer device of claim 31 wherein the plurality of media recommendations are received from the plurality of other peer devices via a proxy server.

36. The peer device of claim 35 wherein the user preferences are stored at the proxy server.

37. The peer device of claim 31 wherein the user preferences are stored at a proxy server.

38. A method comprising:
    providing a list of scored media presentations comprising a first plurality of scored media presentations,
        wherein the list of scored media presentations are stored on a peer device;
    receiving, at the peer device, a media recommendation from each of a plurality of recommending peer devices to provide a plurality of media recommendations,
        wherein:
            each of the plurality of media recommendations identifies a corresponding one of a plurality of media presentations, and
            each media recommendation of the plurality of media recommendations is automatically sent from a corresponding one of the plurality of recommending peer devices in response to playback of the media presentation identified by the media recommendation on the corresponding one of the plurality of recommending peer devices;
    scoring each of the plurality of media presentations corresponding to the plurality of media recommendations to provide a second plurality of scored media presentations;
    automatically updating the list of scored media presentations to include the second plurality of scored media presentations, thereby providing an updated list of scored media presentations;
    automatically selecting a media presentation from the updated list of scored media presentations to play on the peer device,
        wherein the automatically selected media presentation is selected based on the media presentation having a most preferred score among media presentations in the updated list of scored media presentations; and
    automatically playing the selected media presentation on the peer device.

39. The method of claim 38 wherein receiving the media recommendation from each of the plurality of recommending peer devices comprises receiving the media recommendation during playback of a first media presentation, and automatically playing the selected media presentation comprises automatically playing the selected media presentation next in response to completion of playing the first media presentation.

40. The method of claim 38 wherein receiving the media recommendation from each of the plurality of recommending peer devices comprises receiving the media recommendation during playback of a first media presentation, and automatically updating the list of scored media presentations to include the second plurality of scored media presentations occurs during playback of the first media presentation.

41. The method of claim 38 wherein the updated list of scored media presentations is sorted based on scores of the first and second pluralities of scored media presentations.

42. The method of claim 41 further comprising presenting the sorted updated list of scored media presentations to an associated user.

43. The method of claim 41 wherein receiving the media recommendation from each of the plurality of recommending peer devices comprises receiving the media recommendation during playback of an initial media presentation, and the selected media presentation is a first media presentation in the updated list of scored media presentations after application of a no-repeat-factor to the initial media presentation as the selected media presentation to play for an associated user.

44. The method of claim 38 further comprising assigning weights to at least two recommenders of a plurality of recommenders associated with the plurality of recommending peer devices, wherein media presentations that are from the plurality of media presentations corresponding to the plurality of media recommendations and were recommended by the at least two recommenders are scored based on the weights assigned to the at least two recommenders.

45. The method of claim 44 wherein the weights assigned to the at least two recommenders are assigned independently.

46. The method of claim 44 wherein each of the at least two recommenders are assigned different weights.

47. The method of claim 44 further comprising:
receiving user input from an associated user defining an adjustment to be made to the weight assigned to one of the at least two recommenders;
adjusting the weight assigned to the one of the at least two recommenders in response to the user input; and
updating a score of at least one media presentation that is in the updated list of scored media presentations and was recommended by the one of the at least two recommenders in response to adjusting the weight assigned to the one of the at least two recommenders.

48. The method of claim 38 further comprising assigning weights to at least two media presentation attributes, wherein media presentations that are from the plurality of media presentations corresponding to the plurality of media recommendations and have the at least two media presentation attributes are scored based on the weights assigned to the at least two media presentation attributes.

49. The method of claim 48 wherein the weights assigned to the at least two media presentation attributes are assigned independently.

50. The method of claim 48 wherein each of the at least two media presentation attributes are assigned different weights.

51. The method of claim 48 further comprising:
receiving user input from an associated user defining an adjustment to be made to the weight assigned to one of the at least two media presentation attributes;
adjusting the weight assigned to the one of the at least two media presentation attributes in response to the user input; and
updating a score of at least one media presentation that is in the updated list of scored media presentations and has the one of the at least two media presentation attributes in response to adjusting the weight assigned to the one of the at least two media presentation attributes.

52. The method of claim 38 further comprising automatically providing a media recommendation identifying the selected media presentation to the plurality of recommending peer devices in response to playing the selected media presentation.

53. The method of claim 18 wherein the first predetermined threshold is greater than the second predetermined threshold, and the second predetermined threshold is greater than a lowest possible score.

\* \* \* \* \*

UNITED STATES PATENT AND TRADEMARK OFFICE
CERTIFICATE OF CORRECTION

PATENT NO. : 7,680,959 B2  Page 1 of 1
APPLICATION NO. : 11/484130
DATED : March 16, 2010
INVENTOR(S) : Hugh Svendsen It is certified that error appears in the above-identified patent and that said Letters Patent is hereby corrected as shown below:

In the References Cited page 2, col. 2, line 23 add --2006/0195790 A1 8/2006 Beaupre et al.--.

In column 13, at line 14, change "devices" to --device--.

Signed and Sealed this

Twenty-third Day of November, 2010

David J. Kappos
*Director of the United States Patent and Trademark Office*